United States Patent
Neilan, II et al.

(10) Patent No.: US 11,989,009 B2
(45) Date of Patent: May 21, 2024

(54) MODULAR AND RECONFIGURABLE ASSEMBLER SYSTEM FOR AUTONOMOUS IN-SPACE ASSEMBLY

(71) Applicant: UNITED STATES OF AMERICA AS REPRESENTED BY THE ADMINISTRATIVE OF NASA, Washington, DC (US)

(72) Inventors: James H. Neilan, II, Seaford, VA (US); Matthew K. Mahlin, Poquoson, VA (US); John R. Cooper, Yorktown, VA (US); Laura M. White, Hampton, VA (US); Benjamin N. Kelley, Suffolk, VA (US); Matthew P Vaughan, Hampton, VA (US); Iok M. Wong, Poquoson, VA (US); John W. Mulvaney, Yorktown, VA (US); Erik E. Komendera, Christiansburg, VA (US); William D Chapin, Radford, VA (US); Joshua N. Moser, Blacksburg, VA (US); Samantha H. G. Chapin, Aquasco, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 351 days.

(21) Appl. No.: 17/481,805

(22) Filed: Sep. 22, 2021

(65) Prior Publication Data
US 2022/0091593 A1  Mar. 24, 2022

Related U.S. Application Data

(60) Provisional application No. 63/081,671, filed on Sep. 22, 2020.

(51) Int. Cl.
*G05B 19/418* (2006.01)
*B64G 1/24* (2006.01)
(Continued)

(52) U.S. Cl.
CPC ....... *G05B 19/41805* (2013.01); *B64G 1/242* (2013.01); *B64G 1/36* (2013.01);
(Continued)

(58) Field of Classification Search
CPC .......... G05B 19/41805; G05B 19/4184; G05B 19/4188; G05B 2219/24033;
(Continued)

(56) References Cited

U.S. PATENT DOCUMENTS 8,874,262 B2 * 10/2014 Mistry .................. B25J 9/1643
901/15

\* cited by examiner

*Primary Examiner* — David Luo
(74) *Attorney, Agent, or Firm* — Matthew R. Osenga; Shawn P. Gorman; Trenton J. Roche (57) ABSTRACT

Methods and systems to control stacked hexapod platforms for use as tools, which function with both high accuracy and high precision are provided. In some embodiments, the methods and systems include a convergence of modern control theory, and machine learning. Furthermore, some embodiments provide control algorithms to carry out autonomous in-space assembly operations using assemblers. Some embodiments provide methods and systems which combine long-reach low precision manipulators and smaller, high-precision assembler with interchangeable tools.

20 Claims, 7 Drawing Sheets

(51) Int. Cl.
*B64G 1/36* (2006.01)
*G06N 20/00* (2019.01)
*H02P 25/06* (2016.01)
*H02P 29/024* (2016.01)

(52) U.S. Cl.
CPC ..... *G05B 19/4184* (2013.01); *G05B 19/4188* (2013.01); *H02P 25/06* (2013.01); *H02P 29/024* (2013.01); *G05B 2219/24033* (2013.01); *G06N 20/00* (2019.01)

(58) Field of Classification Search
CPC .......... G05B 2219/40277; G05B 2219/40428; B64G 1/242; B64G 1/36; B64G 1/66; B64G 2004/005; B64G 4/00; H02P 25/06; H02P 29/024; G06N 20/00; G06N 3/006; G06N 7/01; B25J 9/1623
USPC ................................ 318/135, 687, 671, 560
See application file for complete search history.

MODULAR AND RECONFIGURABLE ASSEMBLER SYSTEM FOR AUTONOMOUS IN-SPACE ASSEMBLY

CROSS-REFERENCE TO RELATED PATENT APPLICATION

This patent application claims the benefit of and priority to U.S. Provisional Patent Application Ser. No. 63/081,671, filed on Sep. 22, 2020, the contents of which are hereby incorporated by reference in their entirety for any and all non-limiting purposes.

STATEMENT REGARDING FEDERALLY SPONSORED RESEARCH

The invention described herein was made in part by one or more employees of the United States Government and may be manufactured and used by and for the Government of the United States for governmental purposes without the payment of any royalties thereon or therefore.

BACKGROUND OF THE INVENTION

Many space missions require the assembly of space and surface structures such as habitats, power trusses, science equipment, telescopes, refueling stations, and spacecraft. The current practice for missions involving large space structures is to develop complex deployment mechanisms to allow for packaging within a limited launch vehicle volume. Such mechanisms require additional mass that results in undesirable dynamic modes. Current in-space assembly (iSA) concepts rely solely on long-reach manipulators that are typically mission-specific, and incapable of the high-precision manipulation required for assembly tasks.

Originally developed in 1965, a Stewart platform, also known as a hexapod in the field, allows six degree-of-freedom. The Stewart platform consists of two plates connected by six linear actuators. A Stewart platform mechanism transforms the degrees of freedom of each actuator to a 6 degrees of freedom pose of the top plate relative to the bottom plate.

A stacking plurality of Stewart platforms together was developed by NASA in the 1980s. However, such stacked platforms performed poorly having both low accuracy and low precision for the pose of the top plate of the stack. New methods and systems to control stacked platforms for use as tools, which function with both high accuracy and high precision, would be a significant advancement in the technology. These and other shortcomings are addressed by various embodiments disclosed herein.

BRIEF SUMMARY

Various embodiments of the present invention provide a modular and reconfigurable manipulation system architecture for robotic assembly of structures, in locations that prohibit constant human oversight and tele-operation.

In one embodiment of the invention, the modular and reconfigurable assembler system is capable of scheduling, self-reconfiguring, and executing structural assembly tasks with the ability to assess construction components and correct errors in the assembly as needed.

Another embodiment of the invention provides methods and systems to control stacked hexapod modules for use as tools, which function with both high accuracy and high precision. Various methods and systems provide control algorithms to carry out autonomous in-space assembly operations using assemblers. Such algorithms can compensate for failure of one hexapod in an assembler by considering the failed hexapod rigid in its current pose and adjusting the trajectory of the assembler to meet the goal pose.

Some embodiments of the invention provide a control system for an assembly process comprising one or more assemblers which can comprise a task manager, a trajectory generator module, a plurality of joint controller modules, a plurality of sensor fusion modules, and a fault detection module. The control system can include the task manager in communication with a plurality of assemblers, and a plurality of trajectory generator modules, each of the plurality of the trajectory generators in communication with one of the plurality of assemblers. In one embodiment, the control system can comprise a plurality of fault detection modules configured to detect a health state of each hexapod, each of the plurality of fault detection modules in communication with one of the plurality of assemblers. If the health of a hexapod is a fault, the fault detection module reports the fault to a trajectory generator, which can reprogram the assembler with the faulty hexapod to the stated goal pose.

In some configurations, the control system can include a fault detection system configured to detect errors in an alignment of components used in the assembly process and to send a fault/no fault signal to the task manager. The assembler can have a camera configured to take an image of the components then send the image to the fault detection system which compares the image to a library image of the components to determine the fault/no fault signal. The task manager can create a new task is to correct the alignment of the components, if a fault signal is received from the fault detection system.

Some embodiments of the invention provide a method for controlling an assembly process comprising one or more assemblers. The method can include the steps of: determining an optimal number of hexapods in each of a plurality of assemblers involved in the assembly process; assigning tasks to each of the plurality of assemblers involved in the assembly process; receiving a goal pose for one of the plurality of assemblers; calculating trajectories for the lengths of each linear actuator of the hexapods in the one assembler; receiving trajectory data for each actuator of the hexapods in the one assembler; applying calculated voltages to each actuator for the hexapods to move the one assembler into the goal pose; receiving signals from control inputs and sensors onboard the hexapods; generating an estimated state of a position and an orientation of the hexapod; determining a fault state based on the estimated state; and sending a fault/no fault signal to correct the goal pose of the one assembler.

Some embodiments of the invention provide an assembly system comprising, a plurality of assemblers, a task manager in communication with the plurality of assemblers; a plurality of trajectory generator modules, each of the plurality of the trajectory generators in communication with one of the plurality of assemblers; a plurality of joint controller modules, in communication with one each of the plurality of the trajectory generators, each of the plurality of the joint controller modules is configured to receive trajectory data from the one trajectory generator system for each of a plurality of actuators for one hexapod of the one assembler and configured to apply calculated voltages to the actuators for the one hexapod to move the assembler into the goal pose; a plurality of sensor fusion modules in communication with the task manager, each sensor fusion module configured to receive signals from control inputs and sensors onboard the one hexapod and configure to generate an estimated state of a position and an orientation of the one hexapod then provide the estimated state to the task manager; and a fault detection module configured to analyze a geometry and mobility of the one hexapod and send a fault/no fault signal to the trajectory generator.

These and other features, advantages, and objects of the present invention will be further understood and appreciated by those skilled in the art by reference to the following specification, claims, and appended drawings.

BRIEF DESCRIPTION OF THE DRAWINGS

The present disclosure will become more fully understood from the description and the accompanying drawings, wherein.

The drawings described herein are for illustrative purposes only of selected embodiments and not all possible implementations and are not intended to limit the scope of any of the exemplary embodiments disclosed herein or any equivalents thereof. It is understood that the drawings are not drawn to scale. For purposes of clarity, the same reference numbers will be used in the drawings to identify similar elements.

DETAILED DESCRIPTION

The following disclosure is merely exemplary in nature and is in no way intended to limit the described embodiments, their application, or uses. The present invention has been described with reference to various exemplary embodiments. Various modifications and changes may be made to an exemplary embodiment without departing from the scope of the present invention and all such modifications are intended to be included within the scope of the present invention.

For purposes of description herein, the terms "upper," "lower," "right," "left," "rear," "front," "vertical," "horizontal," and derivatives thereof shall relate to the invention as oriented in the drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Various embodiments, described herein, provide methods and systems to control stacked Stewart platforms for use as tools, which function with both high accuracy and high precision. In some embodiments, the methods and systems include a convergence of modern control theory, and machine learning. Furthermore, some embodiments provide control algorithms to carry out autonomous in-space assembly operations using assemblers. Some embodiments provide methods and systems which combine long-reach low precision manipulators and smaller, high-precision assembler with interchangeable tools.

In one embodiment, an assembler includes a stack of connected Stewart platforms. The assembler may consist of a stack of connected Stewart platforms in one embodiment. Yet, in another embodiment, assemblers may come in different size stacks comprising at least one Stewart platform. The assembler can be composed of any number of stacked modules. Each module may be a Stewart platform which is a fully functional six degree-of-freedom robot on its own. As used herein, a Stewart platform may also be referred to as a "module" and an assembler may also be referred to as a "manipulator". A Stewart platform is well known to those skilled in the art and is commonly referred to as a hexapod or a hexapod robot.

Figure 1:
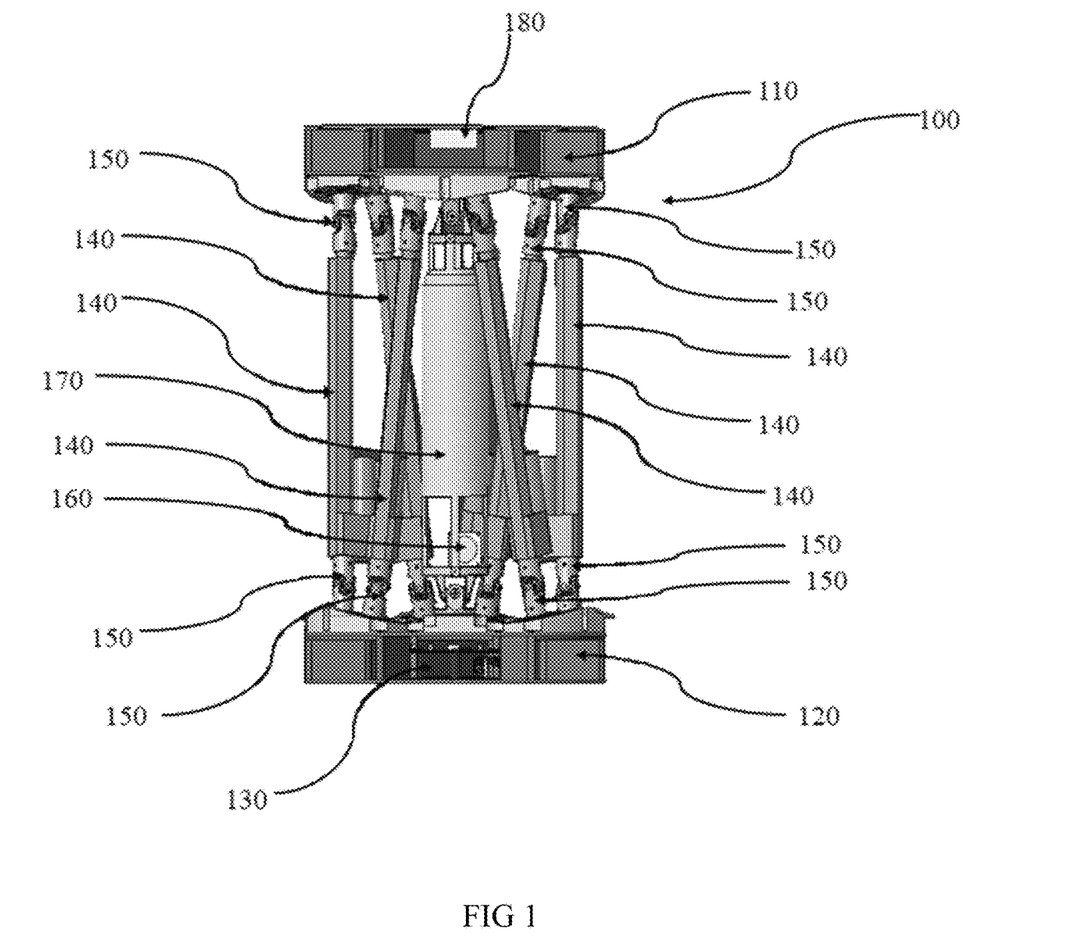
FIG. 1 is a side view of an exemplary Stewart platform, in accordance with various embodiments of the present disclosure.

As illustrated in FIG. 1, an exemplary Stewart platform 100 may consist of two plates (a top module interface 110 and a bottom modular interface 120) connected by six linear actuators 140. Each linear actuator 140 comprises a pair of U-joint connectors 150, which attach the linear actuators 140 to the two plates 110,120. Each linear actuator 140 contains one or more rotational potentiometers configured to provide feedback related to the length of the actuators 140 to a control system (discussed in detail below). The Stewart platform 100 can comprise a column system 160 comprising a string potentiometer 170. The string potentiometer 170 provides feedback of the position and or geometry of the Stewart platform 100 to a control system. The column system 160 is attached in between the top module interface 110 and the bottom modular interface 120, with a pair of U-joint connectors. The central column systems can house the power and communications wiring, as well as the potentiometer, that is needed for module connectivity and operation in a stacked configuration. The Stewart platform 100 transforms the degrees of freedom of each actuator 140 to 6 degrees of freedom pose of the top plate 110 relative to the bottom plate 120.

Figure 2:
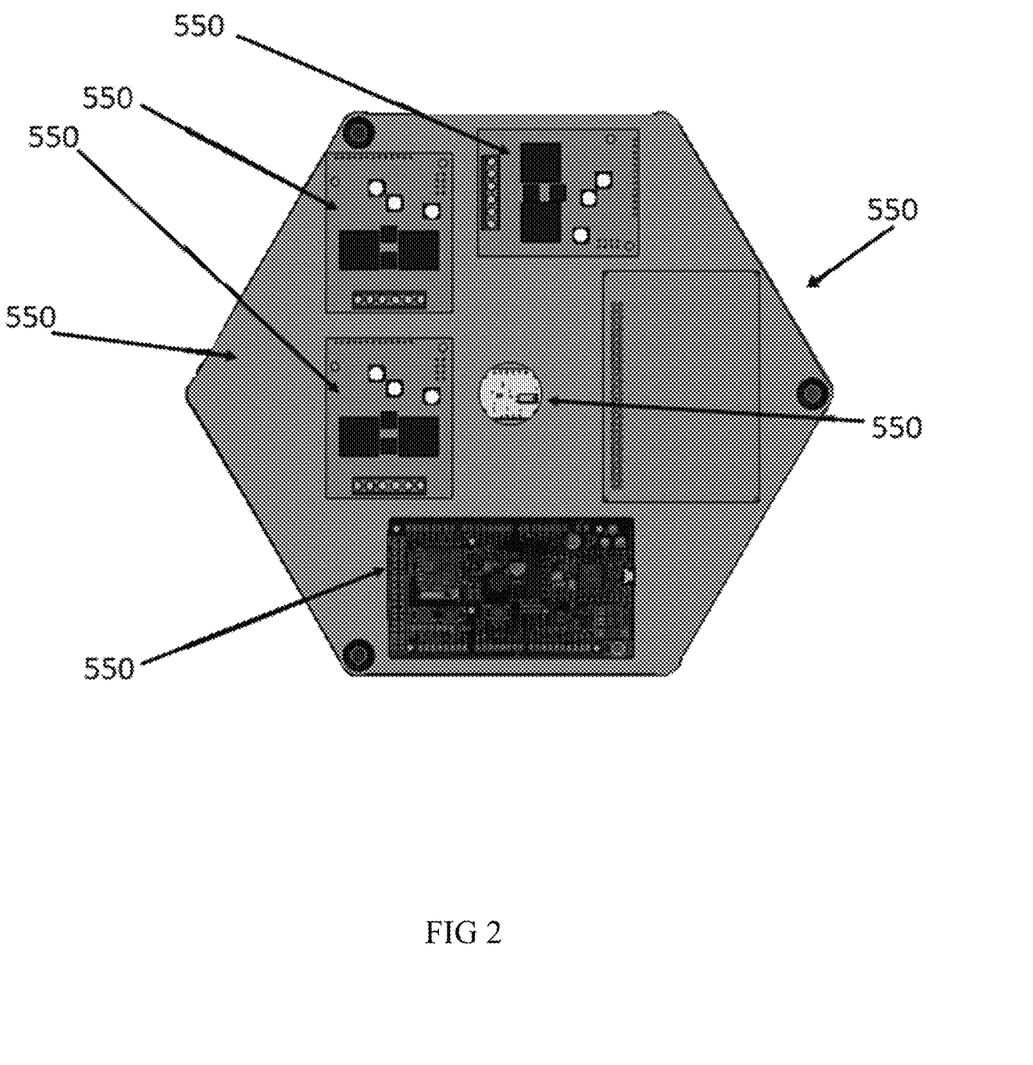
FIG. 2 is top view of a bottom modular interface of the exemplary Stewart platform, in accordance with various embodiments of the present disclosure.

The top module interface 110 can comprise electronics, such as, for example, an inertial measurement unit ("IMU") 160. The bottom modular interface 120 can comprise electronics, such as, for example, as illustrated in FIG. 2. A top view of the bottom modular interface 120 is illustrated in FIG. 2. The bottom modular interface 120 can include a plurality of motor driver boards 210, which control the movements of the linear actuators 140. In addition, the bottom modular interface 120 can include one or more communication boards 220 and one or more power boards 230. Of course, the functions of any of the motor driver boards 210, the communication boards 220, and the power boards 230 can be combined in a single board. Through a hole in the top of the bottom modular interface 120, an IMU 240 is visible, which is on a lower surface of the bottom modular interface 120. A IMU is a well-known device that comprises an acceleration sensor and a gyroscope and are used to detect the acceleration and angular velocity of objects. The IMU 240 can provide measurements based on the acceleration and angular velocity, which can be used as feedback signals that are sent to a control system. The electronics of the bottom modular interface 120, such as, the motor driver boards 210, the communication boards 220, and the power boards 230 are well known to those skilled in the art. The communication boards 220 run a software implementation of one subsystem of the control architecture and communicate to software implementations of the other subsystems.

Figure 3:
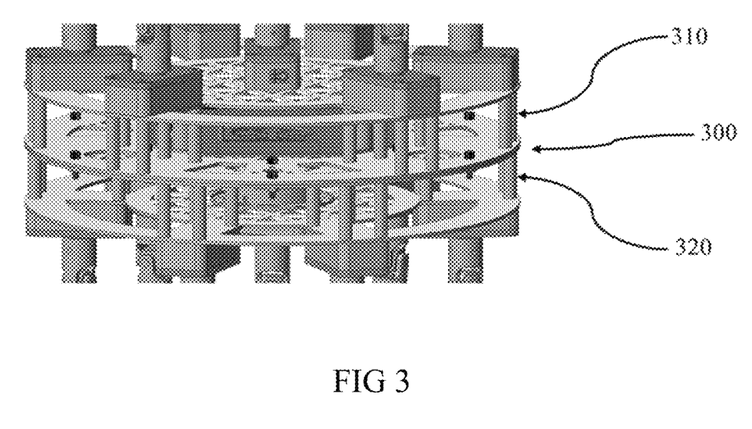
FIG. 3 is side prospective view of a top modular interface of a first Stewart platform coupled to a bottom interface of a second Stewart platform, in accordance with various embodiments of the present disclosure.

FIG. 3 illustrates an exemplary top modular interface 310 (for example, top module interface 110) of a first Stewart platform coupled 300 to an exemplary bottom interface 320 (for example, bottom module interface 120) of a second Stewart platform. In order to build an assembler, the first Stewart platform is coupled to the second Stewart platform. Additional Stewart platforms can be coupled to the first Stewart platform, or the second Stewart platform and other Stewart platforms can be coupled to the additional Stewart platforms. An assembler can have any number of Stewart platforms coupled together in a stack. The coupling of the exemplary top modular interface 310 to the exemplary bottom interface 320 can any fastening system, such as, for example, bolts, rivets, welding, rotational locking systems, snap tight connectors, and the like, which provides a strong and rigid coupling of the modular interfaces 310,320.

Figure 4:
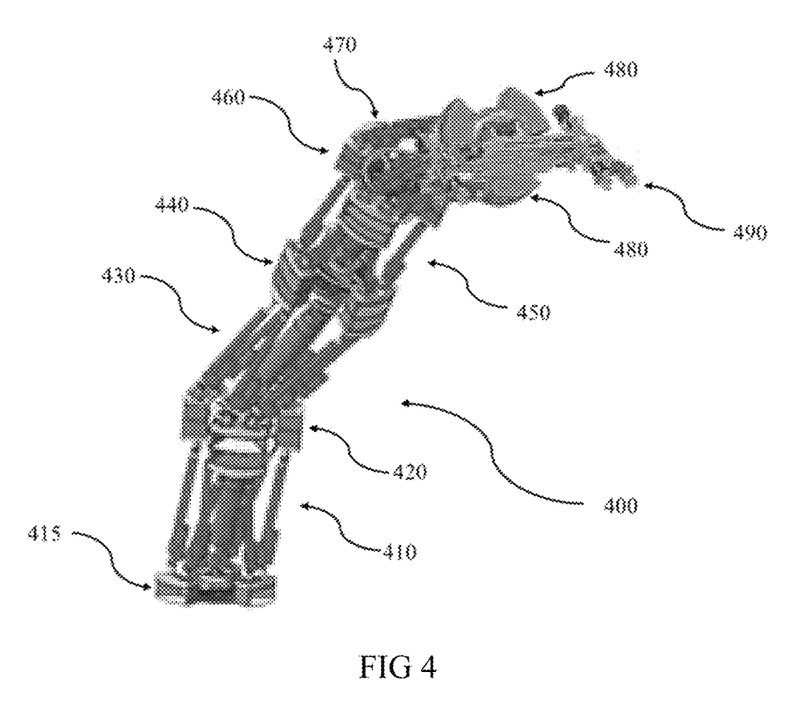
FIG. 4 is side view of an exemplary assembler comprising a plurality of Stewart platforms and an end effector, in accordance with various embodiments of the present disclosure.

Moving to FIG. 4, an exemplary assembler 400 is illustrated. The assembler 400 comprising four Stewart platforms (also referred to herein as: modules or hexapods), however, other assemblers can comprise any number of Stewart platforms. The assembler 400 comprise a first Stewart platform 410 coupled 420 to a second Stewart platform 430 coupled 440 to a third Stewart platform 450 coupled 460 to a fourth Stewart platform 470. In addition, assembler 400 comprising an exemplary end effector 490 removably coupled 480 to the fourth Stewart platform 470.

An end effector 490 is a tool that is operated at the end (top) of the assembler 400. Such tools can be, for example, a gripper (which can function as a hand), a pully system (which can function as a crane), and a coupler (which can function as a welder or a riveter). Depending on the application or construction project, other tools may be used as the end-effector 490. In various embodiments, the end-effector 490 of the assembler 400 is interchangeable and can be swapped out depending on the task. The end-effector 490 can be configured as a strut attachment system, which can include the functions of nut-running and power pass-through. The end-effector 490 can be configured for general construction tasks, such as the handling of truss elements and solar panel modules. The end-effector 490 can be configured for measurement and adjustment tasks, such as, truss jigging and alignment.

In some embodiments, the bottom modular interface 415 of the first Stewart platform 410 rests on a surface and the end effector 490 can manipulate a targeted item location on the same surface. For example, the assembler 400 can be controlled in a pose that is shaped like an upside-down letter U, in which the bottom modular interface 415 is on the same plane with a portion of the end effector 490. If the assembler 400 does not have an end effector 490 attached, the assembler 400 can be controlled in a pose that is shaped like an upside-down letter U, in which the bottom modular interface 415 is on the same plane with portion of a top modular interface 475 of the fourth Stewart platform 470. The bottom modular interface 415 of the first Stewart platform 410 can comprise a base (not shown in FIG. 4) to stabilize the assembler 400 on the surface. Such a base is designed to prevent the assembler 400 from tipping over when a pose of the assembler has a center of gravity outside of center axis perpendicular to the bottom of the first Stewart platform 410.

In various embodiments, one or more assemblers operate as a fully autonomous system. The assemblers self-assemble using a plurality of Stewart platform and an end effector into appropriately configured assembler to build a structure with a single start command from a human operator. However, the ability for a human operator to override actions can be maintained at all levels of operation. This architecture constitutes a robust assembly system that can perform its nominal mission with minimal human interaction and still allow an operator to manually handle scenarios that lie far outside the expected uncertainty levels.

Many space missions can require the assembly of space and surface structures such as habitats, power trusses, science equipment, telescopes, refueling stations, spacecraft, and the like. The current practice for missions involving large space structures is to develop complex deployment mechanisms to allow for packaging within a limited launch vehicle volume. Such mechanisms require additional mass that can result in undesirable dynamic modes. Current in-space assembly (iSA) concepts rely solely on long-reach manipulators that are typically mission-specific, and incapable of the high-precision manipulation required for assembly tasks. While long-reach manipulators may be an important part of the toolbox to perform iSA, a truly practical approach must involve cooperation between long-reach and smaller, high-precision assemblers with interchangeable end effectors.

Currently, if a manipulator has a section that fails, the manipulator is limited in its movement and most likely it is unable to complete its assigned task. The only way to get the manipulator back to fully functional is to send a human into space to repair the section that has failed on the manipulator.

In various embodiments, if a module fails on an assembler in the assembler system, the trajectory generator receives a fault signal from fault detection module, which is in communication with the failed module. The trajectory generator recognizes the current geometry of the failed hexapod, determines the failed hexapod is to remain rigid in its current geometry and reprograms the assembler with the faulty hexapod to the stated goal pose. Since the trajectory generator has reprogramed the assembler with the faulty hexapod, the assembler system can complete its assigned task without human intervention.

Various embodiments provide an autonomous iSA, which comprise a plurality of assemblers that can revolutionize manned and unmanned exploration and mission-planning efforts. In some embodiments, the assembly system operates autonomously and can robustly manipulate, assemble, and service objects with limited or no supervision. The assemblers disclosed herein are a modular, reconfigurable robotic system designed to perform autonomous assembly and construction in space, for example, on the lunar surface. The extra degrees of freedom required for deployment are shifted from the structure itself to an assembly tool that can be reused. For example, the end-effector of the assemblers may be interchangeable and can be swapped out depending on the task.

Such embodiments introduce advantages over the conventional deployment approach including serviceability, expandability, packing efficiency, and modularity. Furthermore, space structure mass and volume are not constrained by limits imposed by a single launch vehicle.

Figure 5:
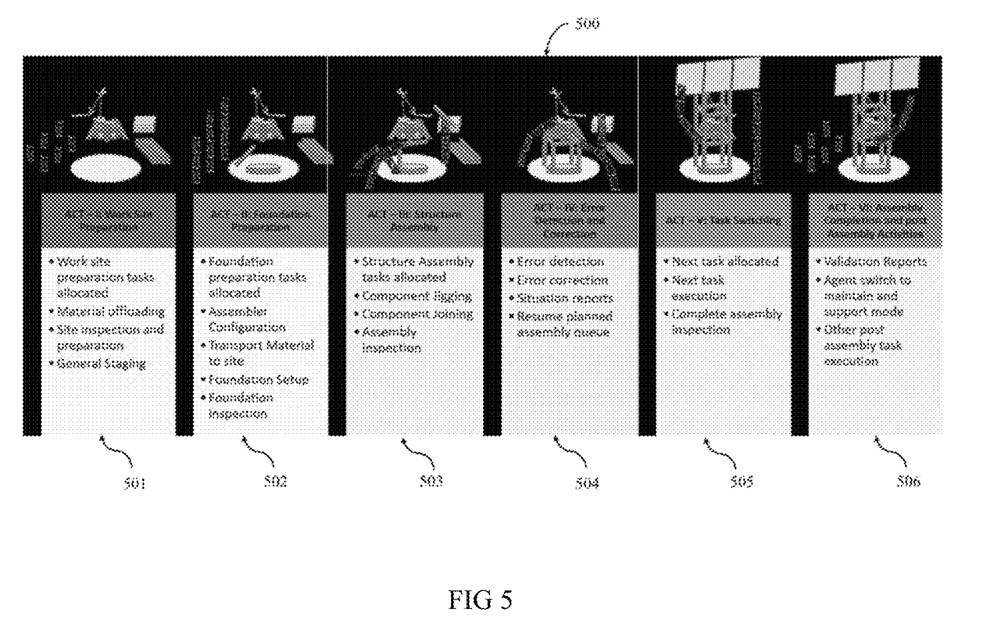
FIG. 5 is a storyboard illustrating an exemplary mission concept as described as six acts, in accordance with various embodiments of the present disclosure.

As illustrated in FIG. 5, a storyboard 500 illustrates an exemplary construction mission, as described as six acts. The first act depicted (panel 501), work site preparation, includes unloading from a lander or series of landers. Upon unloading, a task management system analyzes the overall construction mission, such as based upon the layout of the site, location of manipulators and materials, and/or how the site has been staged, amongst other possible criteria.

The second act depicted (panel 502) may comprise foundation preparation for the structure. In this act, assembler configurations may be determined, tasks are allocated to the assemblers, material is moved from staging area to foundation area, and/or the foundation is set up and inspected.

The third act depicted (panel 503) may initiate the structural assembly including component jigging, joining, and inspection. This act can include tool change tasks and/or assembler reconfiguration as directed by the task manager.

The fourth act depicted (panel 504) can be performed partially or wholly parallel with the third act, as this act entails error detection and correction. The fourth act may also produce situation reports as the assemblers build and inspect. Additionally, the task manager may re-plan depending on the results of inspection steps.

The fifth act depicted (panel 505) may include task switching. Once the backbone structure is assembled, the assemblers can be reconfigured and swap end-effectors to support the addition of components such as power boxes, wiring, and solar panels. Complete assembly inspection is also carried out in the fifth act. Finally in act six (506), the system is switched into a maintenance and support mode, and other post-assembly task may be executed.

In certain embodiments, modularity, reconfigurability, and autonomy are key components to the assembler architecture and are coupled capabilities that are needed for future human habitation of the lunar surface. Assembler embodiments can have a role in construction and maintenance of a lunar gateway and large in-space telescopes. For example, assemblers can be employed in the construction of a lunar surface solar array or for human pre-arrival site preparation. The assembler system has applications in the construction and maintenance of many concepts for in-space and surface structures. Task manager can reconfigure one or more of the assemblers for maintenance purposes.

Figure 6:
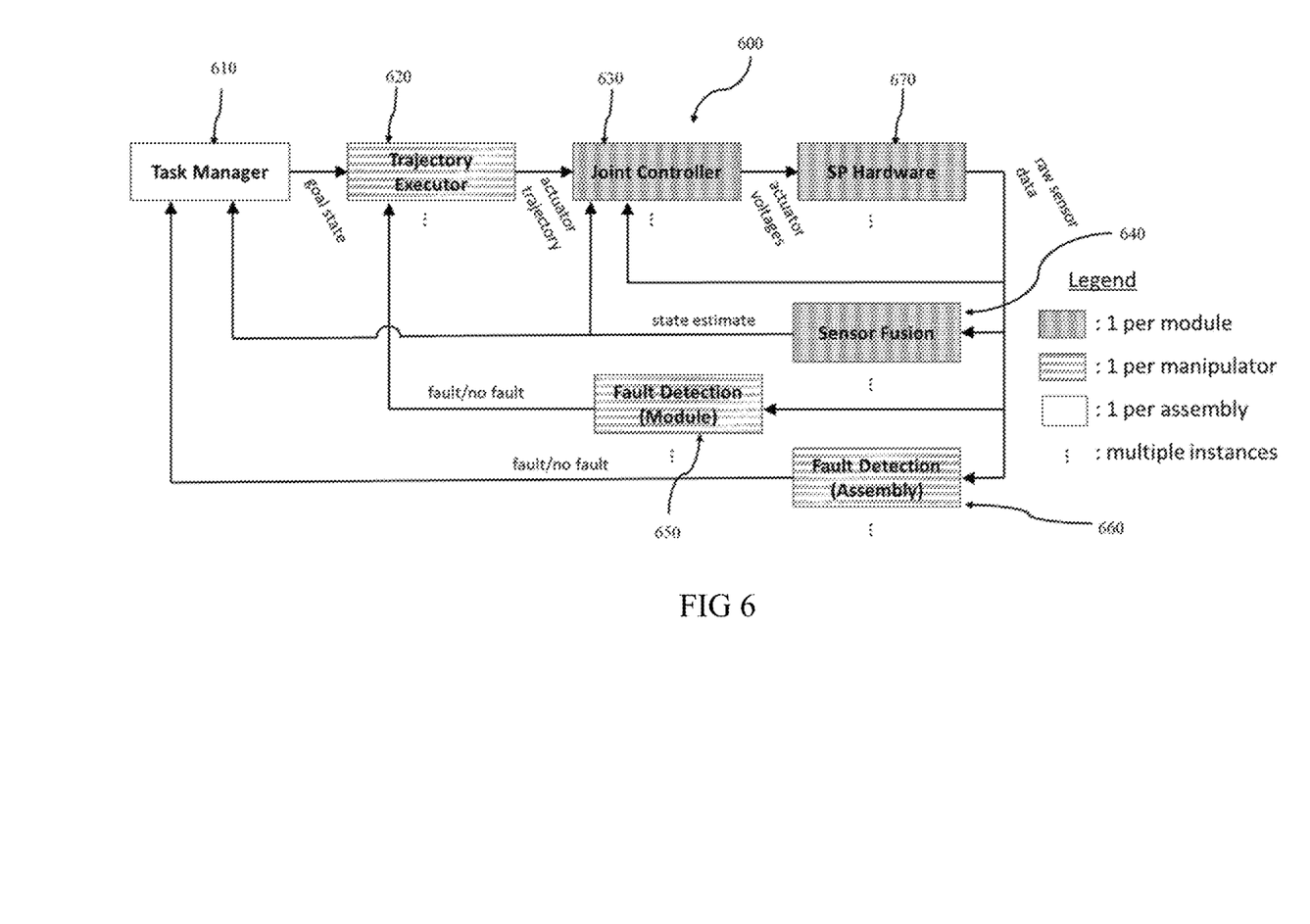
FIG. 6 is a block diagram illustrating exemplary control architecture for an assembler system, in accordance with various embodiments of the present disclosure.

Moving to FIG. 6, a block diagram illustrates a control architecture 600 for an assembler system. The example control architecture 600 is depicted as including five software systems: a task manager 610, a trajectory generator system 620, a joint controller system 630, a sensor fusion system 640, a fault detection module 650 and. In some configurations the control architecture 600 also comprises a fault detection system 650, which can be configured to perform quality control for a structure during assembly and after completion of the assembly. In some embodiments, the joint controller system 630 and the sensor fusion system 640 systems run onboard each module 670. An assembly process may use multiple assemblers, and each assembler can have its own trajectory generator system 620 and fault detection system 650. A single task manager 610 can be used to assign tasks to each of the assemblers in an assembly process, as well as select the number of modules 670 in each assembler.

The task manager 610 can serve two functions: 1) determine the optimal number of modules (Stewart platforms) for each assembler involved in the assembly process, and 2) assign tasks to each of the assemblers involved in the assembly process. The task manager 610 can have access to a simulation of the assembly which can be used to optimize the assembly plan with respect to a given criteria. Two possible criteria to minimize are build time and energy used. Reinforcement learning can be implemented in the task manager 610, as an approximate optimization method for scenarios with large decision spaces. Useful mathematical models of reinforcement learning can be found in Moser, J., Cooper, J. Neilan, J., Chapin, L., Glassner, S., and Komendera, E., "A Reinforcement Learning Approach for the Autonomous Assembly of In-Space Habitats and Infrastructures in Uncertain Environments," International Astronautical Federation (IAF), Washington, D.C., United States, 2019. IAC 19 A5, 3-B3.6, 6, x54219, which is incorporated by reference in its entirety herein.

In one embodiment, the trajectory generator system 620 receives as input a 6 degrees of freedom goal pose for the assembler end-effector from the task manager 610, and outputs to the joint controller system 630 trajectories for the lengths of each linear actuator of all modules 670 in the assembler. The goal pose may represent the task allocated by the task manager 610. The assembler must move its end-effector or payload to that pose to perform the assigned assembly task.

A fault detection module 650 may be in communication with the module 670 and configured to send a fault/no fault signal to the trajectory generator 620. The fault/no fault reports the state of Stewart platforms within the assembler. If a Stewart platform is faulted, either via a determination of a fault detection module or other determination, the trajectory generator 620 can consider that Stewart platform as a rigid link. Then the actuators in the faulted Stewart platform will not be used in the trajectory generation and the assembler is reprogramed to the position of the stated goal pose.

The joint controller system 630 may receive position and speed commands (trajectory) from the generator system 620 for a plurality (including each and every) actuator in the module 670, as well as the expected load through each actuator required to follow the trajectory specified by the trajectory generator. The position command is used to generate a feedback control signal using a proportional controller, and the speed command and load are used to generate a feedforward signal using the calibration curves for the actuator. The control signals generated by the joint controller system 630 are applied directly to each actuator of each of the modules 670. The control signals can be individual actuator voltages, which are applied to the appropriate actuator of the module 670.

The sensor fusion system 640 may receive information from the control inputs and sensors on a plurality of (including each) module 670 to generate an estimate of the position and orientation of the module 670 at each time step. The sensor fusion system 640 can apply an Extended Kalman Filter (EKF) to compute estimates in terms of conditional probability distributions. The sensor fusion system 640 can use an inertial measurement unit ("IMU") simulation to test the probability distributions. As one non-limiting example, useful mathematical models for dynamic motion, the EKF estimation and the IMU simulation, can be found in Cooper J R, Neilan J H, Mahlin M, and White L M, "Assemblers; A Modular, Reconfigurable Manipulator for Autonomous in- Space Assembly", Ascend 2020, Nov. 2, 2020, AIAA 2020-4132 (https://doi.org/10.2514/6.2020-4132), which is incorporated by reference in its entirety herein.

Each module 670 has a joint controller system 630 and a sensor fusion system 640. The communication between the module 670 has a joint controller system 630 and a sensor fusion system 640 is continual while the assembler is moving to a goal pose. The sensor fusion system 640 reported a state estimate of the goal pose to the task manager 610, which can determine if a new goal state should be sent to the trajectory generating system 620.

The fault detection system 660 is responsible for detecting errors in the alignment of components to be assembled. In some embodiments, an assembler completes a task that involved aligning parts for assembly, a camera on the assembler's end-effector can take an image of the two components. The fault detection system 660 takes the image as input and outputs a fault/no fault signal. If a fault is detected, a new task is created in the task manager 610 to correct the alignment. Otherwise, the assembly process continues as planned. The fault detection system 660 can use deep learning to perform the fault/no fault classification. The classifier can be trained using synthetic data generated from CAD models of the assembly components.

Figure 7:
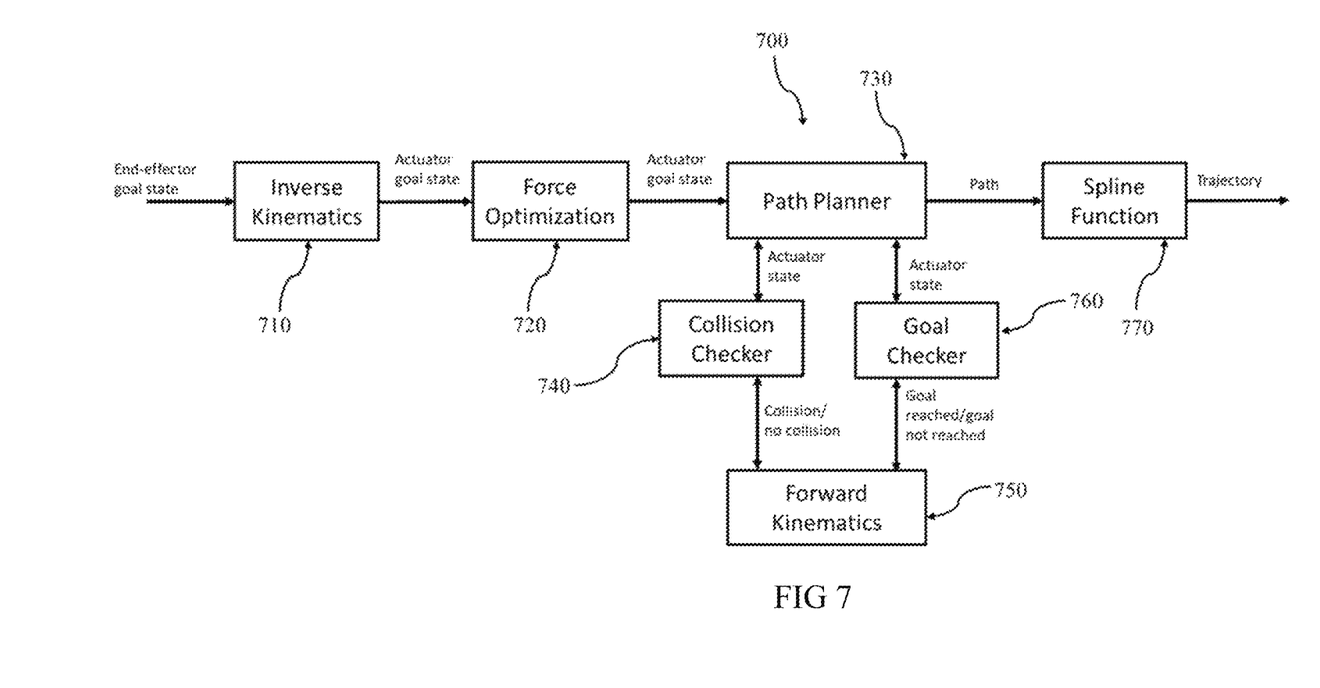
FIG. 7 is a block diagram illustrating exemplary kinematics architecture for an assembler system, in accordance with various embodiments of the present disclosure.

Turning to FIG. 7, a trajectory generator system 700 can use an optimizing version of the Rapidly exploring Random Trees algorithm (RRT*). The RRT* algorithm samples point in the actuator length space (configuration space) and checks the validity of the resulting assembler pose. Checking the validity relies on both the module and assembler level forward kinematics 750 as well as a collision checking algorithm 740. An example of a useful collision-checking algorithm is the Gilbert-Johnson-Keerthi (GJK) algorithm, which can efficiently check for collisions between 3D objects represented as meshes. The RRT* finds a valid path 730 once the goal state is present in the tree. Once this criterion is met, further nodes added to the tree serve to optimize 720 a computable cost function of the path 730.

The configuration space of an assemblers is large (6n, where n is the number of modules in the assembler). Thus, the chances of randomly sampling the goal state are low, so RRT* may take many iterations to find a valid path 730. To encourage the algorithm to find valid paths 730 more quickly, samples can be biased towards the goal state. This requires knowledge of the goal state in configuration space. To obtain a valid goal state 760 in configuration space, a numerical solver is applied to minimize the error between the goal end-effector pose and the end-effector pose calculated by the manipulator-level forward kinematics 750 as a function of Stewart platform top plate poses. The actuator lengths are calculated from the solved Stewart platform top plate poses using the module-level inverse kinematics 710. Once an initial valid inverse kinematics solution is found, a numerical force optimization routine 720 can be applied to find a set a further refined inverse kinematics solution in which the maximum static load through any actuator is minimized. The path 730 produced by RRT* is a list of actuator positions. The trajectory is created from this list of positions by fitting a polynomial spline through each point in the list. A spline function 770 can then be differentiated to obtain speed and acceleration commands for each actuator. The acceleration command in conjunction with the mass properties of the payload of each module can be used to obtain the load through the actuator.

As non-limiting examples, useful mathematical models for Rapidly exploring Random Trees algorithm (RRT*) can be found in Karaman, S., and Frazzoli, E., "Incremental Sampling-based Algorithms for Optimal Motion Planning," arXiv: 1005.0416 2010. URL http://arxiv.org/abs/1005.0416, arXiv: 1005.0416, which is incorporated by reference in its entirety herein and useful mathematical models for Gilbert-Johnson-Keerthi (GJK) algorithm can be found in Gilbert, E., Johnson, D., and Keerthi, S., "A fast procedure for computing the distance between complex objects in three-dimensional space," IEEE Journal on Robotics and Automation, Vol. 4, No. 2, 1988, pp. 193-203. doi:10.1109/56.2083, which is incorporated by reference in its entirety herein.

These assemblers have a complicated geometric structure with nonlinear constraints and many degrees of freedom internal to the structure, leading to over-actuated forward kinematics in stacks greater than one Stewart platform. An over-actuated system has more actuators than the end effector has degrees of freedom. The method of Frobenius norm (FN) minimization can be used to select the inverse kinematic pose which optimizes structural sensitivity. Useful mathematical models for the of Frobenius norm minimization can be found in A. L. Cust'odio, H. Rocha, and L. N. Vicente, "Incorporating minimum frobenius norm models in direct search," Computational Optimization and Applications, vol. 46, no. 2, pp. 265-278, 2010, which is incorporated by reference in its entirety herein. In addition, useful models for inverse kinematics and sensitivity can be found in Balaban D, Cooper J, and Komendera E, "Inverse Kinematics and Sensitivity Minimization of an n-Stack Stewart Platform" Proc. of the 17th International Conference on Autonomous Agents and Multiagent Systems (AAMAS 2018), M. Dastani, G. Sukthankar, E. Andre, S. Koenig (eds.), July 2018, Stockholm, Sweden, which is incorporated by reference in its entirety.

Figure 8:
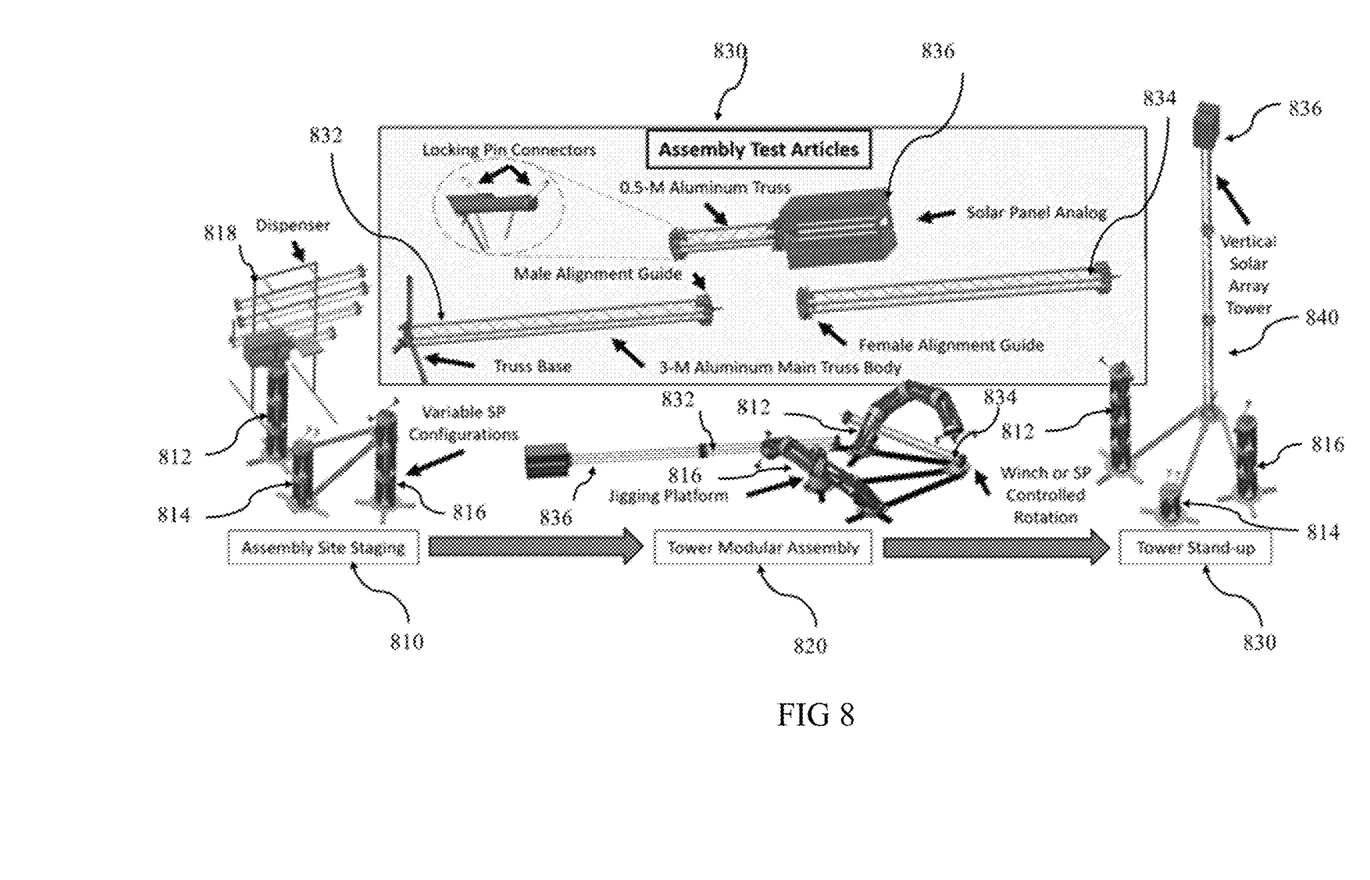
FIG. 8 is a work-flow diagram illustrating an exemplary construction project performed by a plurality of assemblers, in accordance with various embodiments of the present disclosure.

FIG. 8 is a work-flow diagram illustrating an exemplary construction project performed by a plurality of assemblers. An assembly site staging (e.g. staging 810) can be in a remote environment, such as, for example, in space, on a lunar surface, or a planet's surface. A task manager assesses the site, and the assembly instructions then autonomously determines the configurations of a plurality of assemblers. In some embodiments, the task manager is similar to the task manager described in FIG. 6. The task manage can access a dispenser module 818 to control the dispensing of modules (such as Stewart platform or hexapods) The task manager stacks the modules to construct a plurality of assemblers, such as, first assembler 812, second assembler 814, and third assembler 816. As illustrated, each of these assemblers has a different number of stacked platforms. For example, the first assembler 812 appears to have three stacked modules, the second assembler 814 appears to have two stacked modules, and the third assembler 816 appears to have three stacked modules. Each of the assemblers 812, 814, 816 can be equipped with a tool attached to its top plate.

The assemblers 810, 812, 814 may then access a group of assembly components 830. In this example, the assembly components are a truss base 832, an extension truss 834 and a solar array 836. In tower modular assembly 820, the assemblers 812, 814, 816 connect the truss base 832 to the extension truss 834 then attach the solar array 1036 to the opposite end of the extension truss 834. The task manager autonomously allocates tasks to each of the assemblers 812, 814, 816 to perform the tower extension assembly 1032. The tasks are represented by a goal pose, and the task manager generates trajectories to the pose associated with the allocated task. Tasks may include implementation and exchange of tools used by the assemblers 1012, 1014, 1016. A successful allocation of tasks results in complete assembly of the tower from the group of assembly components 830.

With reference to FIG. 6, the task manager 610 autonomously controls all aspects of the tower extension assembly 832 by issuing commands to the local control subsystems of each of the assemblers 812, 814, 816. For example, a first trajectory executer of the task manager 610 is in communication with the first assembler 812, a second trajectory executer of the task manager 610 is in communication with the second assembler 814, and a third trajectory executer of the task manager 610 is in communication with the third assembler 816.

The first trajectory executer can communicate with three joint controller modules and three sensor fusion modules, one for each of the three stacked modules of the first assembler 812. Similarly, a second trajectory executer can communicate with two joint controller modules and two sensor fusion modules, one for each of the two stacked modules of the second assembler 814. Finally, the third trajectory executer can communicate with three joint controller modules and three sensor fusion modules, one for each of the three stacked modules of the third assembler 816.

Three fault detection modules, one for each of the assemblers 1012, 1014, 1016 can provide a fault/no fault signal to the task manager regarding the health of modules comprising assemblers 1012, 1014, 1016 respectively. If the trajectory execution system receives a fault signal, the trajectory execution system provides instructions to the trajectory executor module to not use the faulted Stewart platform when moving. Since a stack of more than one Stewart platform is over-actuated, goal poses will remain reachable in most cases with the loss of a single module, as discussed herein.

The task manager has quality control features, such as fault detection of the tower modular assembly. For example, a fault detection system can be configured to detect errors in an alignment of tower components 830 used in the assembly process and to send a fault/no fault signal to the task manager. One or more of the assemblers 812, 814, 816, can have a camera configured to take an image of the components then send the image to the fault detection system which compares the image to a library image of the components to determine the fault/no fault signal. The task manager can create a new task is to correct the alignment of the components, if a fault signal is received from the fault detection system.

The task manager controls a tower stand up 830, in which the assemblers 812, 814, 816, extend a truss base and move the tower 840 into a vertical and stable position. The task manager can initiate operation of the solar array. The task manager can monitor the tower 840 and the solar array 836 and provide with new instruction to assemblers 812, 814, 816 for maintenance or repair of the tower 840 or solar array 1036.

Various embodiments provide a control system for an assembly process comprising one or more assemblers. The control system can comprise a task manager, a trajectory executer module, a plurality of joint controller modules, a plurality of sensor fusion modules, and/or a fault detection module, amongst other modules.

The task manager may be configured to determine an optimal number of hexapods in one assembler involved in the assembly process, and to assign tasks to each of the assemblers involved in the assembly process.

The trajectory generator module is in communication with the task manager and may be configured to receive a goal pose for the assembler and is configured to calculate trajectories for the lengths of each linear actuator of all hexapods in the assembler.

The plurality of joint controller modules is in communication with the trajectory executor system, each joint controller module is configured to receive trajectory data from the trajectory executor system for each actuator for one hexapod of the assembler and configured to apply calculated voltages to each actuator for the one hexapod to move the assembler into the goal pose.

The plurality of sensor fusion modules is in communication with the task manager, each sensor fusion module is configured to receive signals from control inputs and sensors onboard the one hexapod and configure to generate an estimated state of a position and an orientation of the one hexapod then provide the estimated state to the task manager.

The fault detection module may be configured to analyze health of hexapods comprising an assembler and to send a fault/no fault signal to the trajectory generator. If the health of a hexapod is a fault, the fault detection module reports the fault to a trajectory generator, which can reprogram the assembler with the faulty hexapod to the stated goal pose.

The control system can include the task manager in communication with a plurality of assemblers, and a plurality of trajectory generator modules, each of the plurality of the trajectory generators in communication with one of the plurality of assemblers. The control system can comprise a plurality of fault detection systems configured to detect errors in the assembly process, each of the plurality of fault detection systems in communication with one of the plurality of assemblers.

The control system can include a fault detection system configured to detect errors in an alignment of components used in the assembly process and to send a fault/no fault signal to the task manager. The assembler can have a camera configured to take an image of the components then send the image to the fault detection system which compares the image to a library image of the components to determine the fault/no fault signal. The task manager can create a new task is to correct the alignment of the components, if a fault signal is received from the fault detection system.

The sensor fusion system can be configured to apply an Extended Kalman Filter to compute the estimated state in terms of a conditional probability distribution and compares data from an inertial measurement unit located in the hexapod to test the probability distribution. The task manager can be configured to implement a reinforcement learning algorithm to approximate an optimized assembly process for scenarios with large decision spaces.

The control system can comprise a wireless communication link onboard the one hexapod, the wireless communication link can be configured for wireless communication with at least one of the task manager, the trajectory executer, the joint controller module, the sensor fusion module, and the fault detection module.

In some configurations, at least one of the joint controller module and the sensor fusion module are onboard the one hexapod. The assembler may have an end effector on a top plate of the assembler. The end effector can be one of a gripper system, a pully system, and a component coupling system.

Various embodiments provide a method for controlling an assembly process comprising one or more assemblers. The method can include the steps of: determining an optimal number of hexapods in each of a plurality of assemblers involved in the assembly process; assigning tasks to each of the plurality of assemblers involved in the assembly process; receiving a goal pose for one of the plurality of assemblers; calculating trajectories for the lengths of each linear actuator of the hexapods in the one assembler; receiving trajectory data for each actuator of the hexapods in the one assembler; applying calculated voltages to each actuator for the hexapods to move the one assembler into the goal pose; receiving signals from control inputs and sensors onboard the hexapods; generating an estimated state of a position and an orientation of the hexapod; determining a fault state based on the sensor data; and sending a fault/no fault signal to correct the goal pose of the one assembler.

The method of claim may include the steps of detecting errors in an alignment of components used in the assembly process; sending a fault/no fault signal; and correcting the alignment of the components, if a fault signal is received.

The method may include the steps of taking an image of the components; and comparing the image to a library image of the components to determine the fault/no fault signal.

The method may include the steps of receiving a fault signal to correct the goal pose of the one assembler; and calculating new trajectories for the lengths of each linear actuator of the hexapods in the one assembler to correct the goal pose of the one assembler.

Various embodiments provide an assembly system comprising, a plurality of assemblers, a task manager in communication with the plurality of assemblers; a plurality of trajectory generator modules, each of the plurality of the trajectory generators in communication with one of the plurality of assemblers; a plurality of joint controller modules, in communication with one each of the plurality of the trajectory generators, each of the plurality of the joint controller modules is configured to receive trajectory data from the one trajectory generator system for each of a plurality of actuators for one hexapod of the one assembler and configured to apply calculated voltages to the actuators for the one hexapod to move the assembler into the goal pose; a plurality of sensor fusion module in communication with the task manager, each sensor fusion module configured to receive signals from control inputs and sensors onboard the one hexapod and configure to generate an estimated state of a position and an orientation of the one hexapod then provide the estimated state to the task manager; and a fault detection module configured to analyze the health status of the hexapods in an assembler and send a fault/no fault signal to the trajectory generator.

The task manager can be configured to autonomously control the plurality of assemblers to build a predetermined assembly. The system may include a plurality of fault detection systems configured to detect errors in the assembly process, each of the plurality of fault detection systems in communication with one of the plurality of assemblers and the task manager.

It should be understood that steps within a method may be executed in different order without altering the principles of the present disclosure. For example, various embodiments may be described herein in terms of various functional components and processing steps. It should be appreciated that such components and steps may be realized by any number of hardware components configured to perform the specified functions.

As used herein, the phrase "at least one of A, B, and C" can be construed to mean a logical (A or B or C), using a non-exclusive logical "or," however, can be contrasted to mean (A, B, and C), in addition, can be construed to mean (A and B) or (A and C) or (B and C).

The present invention has been described above with reference to various exemplary embodiments and examples, which are not intended to be limiting in describing the full scope of systems and methods of this invention. However, those skilled in the art will recognize that equivalent changes, modifications and variations of the embodiments, materials, systems, and methods may be made within the scope of the present invention, with substantially similar results, and are intended to be included within the scope of the present invention, as set forth in the following claims.

What is claimed is:

1. A control system for an assembly process comprising one or more assemblers, the system comprising:
    a task manager configured to determine an optimal number of hexapods in one assembler involved in the assembly process, and to assign tasks to each of the assemblers involved in the assembly process;
    trajectory generator module in communication with the task manager to receive a goal pose for the assembler and configured to calculate trajectories for the lengths of each linear actuator of all hexapods in the assembler;
    a plurality of joint controller modules in communication with the trajectory generator system, each joint controller module is configured to receive trajectory data from the trajectory generator system for each actuator for one hexapod of the assembler and configured to apply calculated voltages to each actuator for the one hexapod to move the assembler into the goal pose;
    a plurality of sensor fusion modules in communication with the task manager, each sensor fusion module configured to receive signals from control inputs and sensors onboard the one hexapod and configured to generate an estimated state of a position and an orientation of the one hexapod then provide the estimated state to the task manager; and
    a fault detection module configured to analyze the health of the one hexapod and to send a fault/no fault signal to the trajectory generator.

2. The control system of claim 1, wherein the task manager is in communication with a plurality of assemblers, further comprising a plurality of trajectory generator modules, each of the plurality of the trajectory generators in communication with one of the plurality of assemblers.

3. The control system of claim 2, further comprising a plurality of fault detection systems configured to detect errors in the assembly process, each of the plurality of fault detection systems in communication with one of the plurality of assemblers.

4. The control system of claim 3, wherein the assembler comprises a camera configured to take an image of the components then send the image to the fault detection system which compares the image to a library image of the components to determine the fault/no fault signal.

5. The control system of claim 3, wherein the task manager creates a new task to correct the alignment of the components, if a fault signal is received from the fault detection system.

6. The control system of claim 1, further comprising a fault detection system configured to detect errors in an alignment of components used in the assembly process and send a fault/no fault signal to the task manager.

7. The control system of claim 1, wherein the sensor fusion system applies an Extended Kalman Filter to compute the estimated state in terms of a conditional probability distribution and compares data from an inertial measurement unit located in the hexapod to test the probability distribution.

8. The control system of claim 1, wherein, the joint controller module and the sensor fusion module are onboard the one hexapod.

9. The control system of claim 1, wherein the task manager creates a new task is to correct the goal pose based on the estimated state received from the sensor fusion module.

10. The control system of claim 1, wherein the task manager is configured to implement a reinforcement learning algorithm to approximate an optimized assembly process for scenarios with large decision spaces.

11. The control system of claim 1, further comprising a wireless communication link onboard the one hexapod, the wireless communication link is configured for wireless communication with at least one of the task manager, the trajectory generator, the joint controller module, the sensor fusion module, and the fault detection module.

12. The control system of claim 1, wherein the assembler further comprises an end effector on a top plate of the assembler.

13. The control system of claim 12, wherein the end effector is one of a gripper system, a pully system, and a component coupling system.

14. A method for controlling an assembly process comprising one or more assemblers, the method comprising:
determining an optimal number of hexapods in each of a plurality of assemblers involved in the assembly process;
assigning tasks to each of the plurality of assemblers involved in the assembly process;
receiving a goal pose for one of the plurality of assemblers;
calculating trajectories for the lengths of each linear actuator of the hexapods in the one assembler;
receiving trajectory data for each actuator of the hexapods in the one assembler;
applying calculated voltages to each actuator for the hexapods to move the one assembler into the goal pose;
receiving signals from control inputs and sensors onboard the hexapods;
generating an estimated state of a position and an orientation of the hexapod;
determining a fault state based on the estimated state; and
sending a fault/no fault signal to correct the goal pose of the one assembler.

15. The method of claim 14 further comprising:
detecting errors in an alignment of components used in the assembly process;
sending a fault/no fault signal; and
correct the alignment of the components, if a fault signal is received.

16. The method of claim 15 further comprising:
taking an image of the components; and
comparing the image to a library image of the components to determine the fault/no fault signal.

17. The method of claim 15 further comprising:
receiving a fault signal to correct the goal pose of the one assembler; and
calculating new trajectories for the lengths of each linear actuator of the hexapods in the one assembler to correct the goal pose of the one assembler.

18. An assembly system comprising,
a plurality of assemblers,
a task manager in communication with the plurality of assemblers;
a plurality of trajectory generator modules, each of the plurality of the trajectory generators in communication with one of the plurality of assemblers;
a plurality of joint controller modules, in communication with one each of the plurality of the trajectory generators, each of the plurality of the joint controller modules is configured to receive trajectory data from the one trajectory generator system for each of a plurality of actuators for one hexapod of the one assembler and configured to apply calculated voltages to the actuators for the one hexapod to move the assembler into the goal pose;
a plurality of sensor fusion module in communication with the task manager, each sensor fusion module configured to receive signals from control inputs and sensors onboard the one hexapod and configure to generate an estimated state of a position and an orientation of the one hexapod then provide the estimated state to the task manager; and
a fault detection module configured to analyze a health state of the one hexapod and send a fault/no fault signal to the trajectory generator.

19. The system of claim 18, wherein the task manager autonomously controls the plurality of assemblers to build a predetermined assembly.

20. The system of claim 19 further comprising:
a plurality of fault detection systems configured to detect errors in the assembly process, each of the plurality of fault detection systems in communication with one of the plurality of assemblers and the task manager.

* * * * *